United States Patent
Nelli et al.

(10) Patent No.: US 10,160,067 B2
(45) Date of Patent: Dec. 25, 2018

(54) DATA ACQUISITION USING A PURGE PLUG

(71) Applicant: ILLINOIS TOOL WORKS INC., Glenview, IL (US)

(72) Inventors: Christopher J. Nelli, Schaumburg, IL (US); Joseph Peter McGowan, Glenview, IL (US); Charles R. Tiller, Glenview, IL (US); Steven Edward Barhorst, Sidney, OH (US)

(73) Assignee: Illinois Tool Works Inc., Glenview, IL (US)

( * ) Notice: Subject to any disclaimer, the term of this patent is extended or adjusted under 35 U.S.C. 154(b) by 433 days.

(21) Appl. No.: 14/258,886

(22) Filed: Apr. 22, 2014

(65) Prior Publication Data

US 2014/0333063 A1    Nov. 13, 2014

Related U.S. Application Data

(60) Provisional application No. 61/822,069, filed on May 10, 2013.

(51) Int. Cl.
*B23K 37/00* (2006.01)
*B23K 9/32* (2006.01)
(Continued)

(52) U.S. Cl.
CPC .............. *B23K 37/00* (2013.01); *B23K 9/326* (2013.01); *F16L 55/1141* (2013.01); *G01K 1/14* (2013.01)

(58) Field of Classification Search
CPC .......... B23K 37/00; B23K 9/326; G01K 1/14; F16L 55/1141
(Continued)

(56) References Cited

U.S. PATENT DOCUMENTS

| | | | | |
|---|---|---|---|---|
| 3,194,466 A | * | 7/1965 | Davis | B23K 9/325 138/90 |
| 3,264,874 A | * | 8/1966 | Fischer | C21O 5/30 136/234 |

(Continued)

FOREIGN PATENT DOCUMENTS

| | | |
|---|---|---|
| CN | 101862880 | 10/2010 |
| CN | 201871862 | 6/2011 |

(Continued)

OTHER PUBLICATIONS

International Search Report from PCT application No. PCT/US2014/036167, dated Oct. 14, 2014, 12 pgs.

*Primary Examiner* — Son Le
*Assistant Examiner* — Marrit Eyassu
(74) *Attorney, Agent, or Firm* — McAndrews, Held & Malloy, Ltd.

(57) ABSTRACT

A welding system using a purge plug for data acquisition. In one example, a purge plug includes purge plug component having a sealing structure. The sealing structure is configured to abut a surface of a hollow device and to form a seal between the sealing structure and the hollow device. The purge plug also includes a sensor at least partly disposed in the purge plug component, the sealing structure, or some combination thereof. The purge plug component is configured to be disposed on a workpiece having the hollow device to purge an undesired gas from the workpiece.

8 Claims, 3 Drawing Sheets

(51) Int. Cl.
*F16L 55/11* (2006.01)
*G01K 1/14* (2006.01)

(58) Field of Classification Search
USPC .......................................... 285/119; 73/31.05
See application file for complete search history.

(56) References Cited

U.S. PATENT DOCUMENTS

| | | | | |
|---|---|---|---|---|
| 3,724,273 A * | 4/1973 | Awrey | ................ | F16L 55/1608 138/89 |
| 4,444,352 A * | 4/1984 | Glascock, II | ........ | B23K 20/023 228/106 |
| 4,780,072 A * | 10/1988 | Burnette | ............... | B29C 33/485 118/205 |
| 5,312,092 A * | 5/1994 | Decker | ................. | B22D 1/005 266/220 |
| 5,364,008 A * | 11/1994 | Stacher | ................... | G01K 1/14 228/103 |
| 5,390,846 A * | 2/1995 | Thode | ................... | B23K 9/326 219/74 |
| 6,739,204 B1 * | 5/2004 | Barefoot | ............ | B23K 37/0533 219/136 |
| 6,834,556 B2 * | 12/2004 | Cain | ..................... | G01M 3/002 73/861.24 |
| 7,984,934 B1 * | 7/2011 | Blaton | ................... | F16L 13/08 285/13 |
| 9,296,060 B2 * | 3/2016 | Hacikyan | ............... | B23K 9/325 |
| 2010/0083738 A1 * | 4/2010 | Padden | ................. | G01M 3/022 73/49.8 |
| 2011/0127238 A1 * | 6/2011 | Johnson | ................ | B23K 9/326 219/61.5 |

FOREIGN PATENT DOCUMENTS

| | | |
|---|---|---|
| CN | 102489911 | 6/2012 |
| DE | 102006003047 | 7/2007 |
| KR | 20100009351 | 1/2010 |

* cited by examiner

DATA ACQUISITION USING A PURGE PLUG

This application is a Non provisional patent application of U.S. Provisional Patent Application No. 61/822,069, entitled "DATA ACQUISITION USING A PURGE PLUG", filed May 10, 2013, which is incorporated herein by reference in its entirety.

BACKGROUND

The invention relates generally to welding systems and, more particularly, to data acquisition using a purge plug in a welding system.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

Welding operations are performed on a variety of different materials. For example, a workpiece may be formed from a carbon steel or a corrosion resistant alloy, such as stainless steel. Certain workpieces may be sensitive to heat, such as heat produced during a welding operation. Accordingly, a quality of a weld on a workpiece may depend on temperatures that the workpiece is exposed to during the welding operation. Unfortunately, it may be difficult to detect the temperature of a workpiece near a joint while a welding operation is occurring on the joint. Thus, it may be difficult to determine temperatures that a workpiece is exposed to during the welding operation.

BRIEF DESCRIPTION

In one embodiment, a purge plug includes a purge plug component having a sealing structure. The sealing structure is configured to abut a surface of a hollow device and to form a seal between the sealing structure and the hollow device. The purge plug system also includes a sensor at least partly disposed in the purge plug component, the sealing structure, or some combination thereof. The purge plug component is configured to be disposed on a workpiece having the hollow device to purge an undesired gas from the workpiece.

In another embodiment, a purge plug system includes a first gas sealing structure configured to form a first seal between the first gas sealing structure and a hollow device. The purge plug also includes a second gas sealing structure configured to form a second seal between the second gas sealing structure and the hollow device. The purge plug includes a shaft coupled to the first and second gas sealing structures. The purge plug also includes a first sensor at least partly disposed in the first gas sealing structure, the second gas sealing structure, the shaft, or some combination thereof.

In a further embodiment, a purge plug system includes a purge component comprising a first gas sealing structure configured to form a first seal between the first gas sealing structure and a hollow device. The purge plug system additionally includes a transmitter at least partly disposed in the purge plug component.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
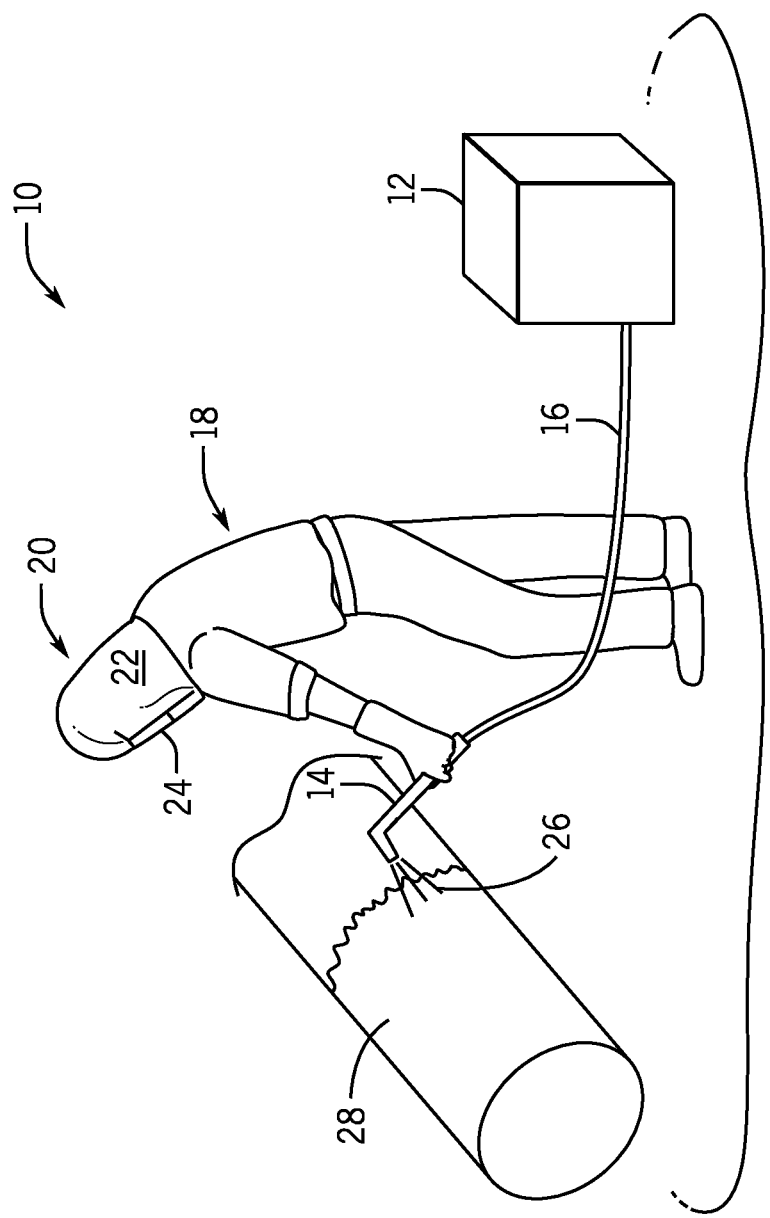
FIG. 1 is an illustration of an embodiment of a welding system including a workpiece that may be formed from a carbon steel or a corrosion resistant alloy, in accordance with aspects of the present disclosure.

Embodiments of the present invention may be used in any application where one or more temperatures, or other sensed data may be detected. For example, FIG. 1 illustrates an arc welding system 10. As depicted, the arc welding system 10 may include a power supply 12 that generates and supplies welding power to an electrode 14 via a conduit 16. In the arc welding system 10, a direct current (DC), an alternating current (AC), and/or a pulsed power (e.g., pulsed DC and pulsed AC) may be used along with the consumable or non-consumable electrode 14 to deliver current to the point of welding. In such a welding system 10, an operator 18 may control the location and operation of the electrode 14 by positioning the electrode 14 and triggering the starting and stopping of the current flow. As illustrated, a helmet assembly 20 is worn by the welding operator 18. The helmet assembly 20 includes a helmet shell 22 and a lens assembly 24 that may be darkened to prevent or limit exposure to the light generated by a welding arc 26.

When the operator 18 begins the welding operation (or other operation such as plasma cutting) by applying power from the power supply 12 to the electrode 14, the welding arc 26 is developed between the electrode 14 and a workpiece 28, such as the illustrated pipe. The workpiece 28 may be formed from a carbon steel or a corrosion resistant alloy, such as stainless steel, or other metals and alloys (e.g., aluminum, titanium, zirconium, niobium, tantalum, nickel alloys). Non-metal workpieces 28 may also be welded or otherwise joined, for example, by stir welding. The electrode 14 and the conduit 16 thus deliver current and voltage sufficient to create the welding arc 26 between the electrode 14 and the work piece 28. The welding arc 26 melts the metal (the base material and any filler material added) at the point of welding between the electrode 14 and the work piece 28, thereby providing a joint when the metal cools. The welding system 10 may be configured to form a weld joint by any suitable technique, including shielded metal arc welding (SMAW) (i.e., stick welding), gas tungsten arc welding (GTAW), gas metal arc welding (GMAW), flux-cored arc welding (FCAW), metal inert gas welding (MIG), tungsten inert gas welding (TIG), gas welding (e.g., oxy-acetylene welding), sub-arc welding (SAW), and/or resistance welding. As may be appreciated, shielding gas may be used in certain applications, such as GTAW, GMAW, and FCAW, for example. Waveforms used during welding may include regulated metal deposition (RMD) type waveforms, among others, surface tension transfer (STT), cold metal transfer (CMT).

Generally, the techniques described herein enable certain operations (e.g., welding, cutting, grinding, induction heating, testing) to be performed on the workpiece 28 by applying power supplied by the power supply 12. The workpiece 28 may be disposed in an industrial facility (e.g., industrial plant, shipyard) but may also be disposed in a residential facility, such as a garage or a home. The workpiece 28 may include tubular pieces (e.g., pipe), flat sheeting (e.g., metal or plastic sheets and plates), angled workpieces 28 (e.g., angle iron) or any other piece that may be welded, cut, ground, induction heated, or tested, for example, by using power delivered via the power supply 12.

As described below, heat applied to the workpiece 28 may be detected (e.g., sensed) using one or more temperature sensors. The power supply 12 may be configured to store the detected data. By using the temperature sensors, temperatures of the workpiece 28 near a welding application may be detected and/or monitored to determine a quality of a welding operation and/or to control temperature of a welding operation being performed. As may be appreciated, temperature sensors may be used in any application where temperature detection is desired, such as welding, cutting, grinding, induction heating, testing, and so forth. Furthermore, pressure sensors may be used to monitor a pressure of gas within a conduit (e.g., pipe), for example. Moreover, a quality of a weld may be examined by using a transmitter and receiver (e.g., x-rays, ultrasound). Likewise, a gas sensor may be used to determine a gas composition and/or amount of a given gas in the workpiece 28.

Figure 2:
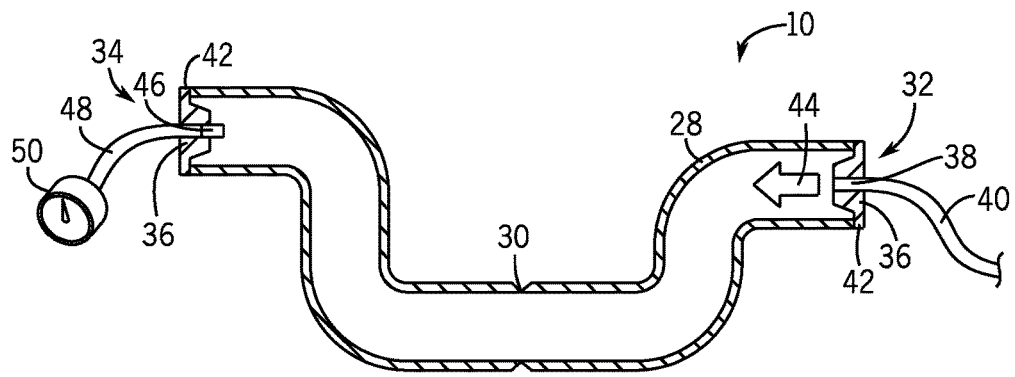
FIG. 2 is a cross-sectional view of a welding system using purge plugs, in accordance with aspects of the present disclosure.

FIG. 2 is a cross-sectional view of the welding system 10 using purge plugs. A purge plug may be used to purge or otherwise expel unwanted gases from interior spaces, such as the space inside of a conduit, such as a pipe. During welding, it may be beneficial to expel unwanted gas (e.g., oxygen and nitrogen) and replace the gas with an inert gas (e.g., argon). Accordingly, the final weld may be free of oxidation or granulation inside of the pipe, improving fluid flow through the ungranulated pipe when compared to granulated pipes. The techniques described herein provide for purge plugs, that in addition to plugging certain conduits and expelling unwanted gases, also incorporate sensing embodiments, as described in more detail below, suitable for sensing a variety of conditions to improve welding.

In the depicted embodiment of FIG. 2, the workpiece 28 has a joint 30 where joining (e.g., welding) is to be performed. A first purge plug 32 is disposed in one end of the workpiece 28 (e.g., a hollow device such as a pipe or tube, a cylindrical device, a non-cylindrical device, etc.), while a second purge plug 34 is disposed in another (e.g., opposite) end of the workpiece 28. The first and second purge plugs 32 and 34 each include a purge plug component (e.g., hub) 36 in a central region. Moreover, the first purge plug 32 includes an inlet 38 in the hub 36. A hose 40 is coupled to the inlet 38 and is configured to direct a gas (e.g., an inert gas) toward the inlet 38. The first and second purge plugs 32 and 34 also each include a sealing structure 42 configured to abut a surface of the workpiece 28 and to form a seal with the workpiece 28 to block gas from flowing past the purge plugs 32 and 34 from within the workpiece 28 (e.g., interior of the hollow device such as a pipe interior, etc.). The sealing structure 42 of each of the purge plug 32 and 34 may include any suitable sealing device. As may be appreciated, the hub 36 may refer generally to the central region of the purge plugs 32 and 34, and may not be structurally different than, or separate from, the sealing structure 42. In certain embodiments, the sealing structure 42 may include the hub 36.

During operation, an inert gas (e.g., argon) is directed into the inlet 38 of the first purge plug 32 via the hose 40 to purge other gases out of the interior of the workpiece 28, thereby purging undesirable gases (e.g., oxygen and nitrogen) out of the interior of the workpiece 28 (e.g., two abutting sections of pipe or tubing). The inert gas flows into the workpiece 28 as illustrated by arrow 44 and directs the undesirable gases toward the second purge plug 34 where the undesirable gases may exit the interior of the workpiece 28. The second purge plug 34 may include an outlet 46 which may facilitate the undesirable gases exiting the interior of the workpiece 28. Moreover, the first purge plug 32 may also include an outlet to facilitate undesirable gases exiting the interior of the workpiece 28. Furthermore, a hose 48 may be coupled between the outlet 46 and a pressure sensor 50. In certain embodiments, the pressure sensor 50 may be coupled directly to the outlet 46. Accordingly, a pressure of gases within the workpiece 28 may be detected and/or monitored. It is to be noted that while the purge plugs 32 and 34 are shown inserted into the workpiece 28, the plugs 32, 34 may have diameters larger then openings of the workpiece 28 and may thus plug the workpiece 28 by abutting the openings from outside of the workpiece 28, thus sealing the workpiece 28 without being inserted into the workpiece 28.

Figure 3:
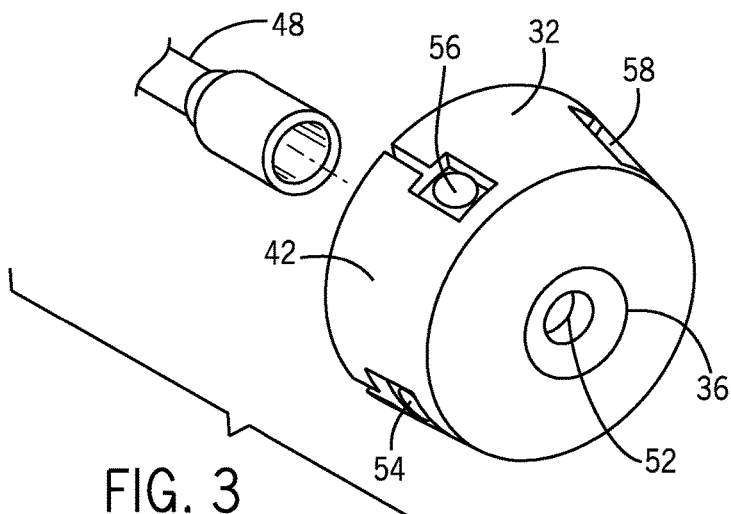
FIG. 3 is a perspective view of an embodiment of a purge plug with a sensor disposed at least partly in the purge plug, in accordance with aspects of the present disclosure.
Figure 4:
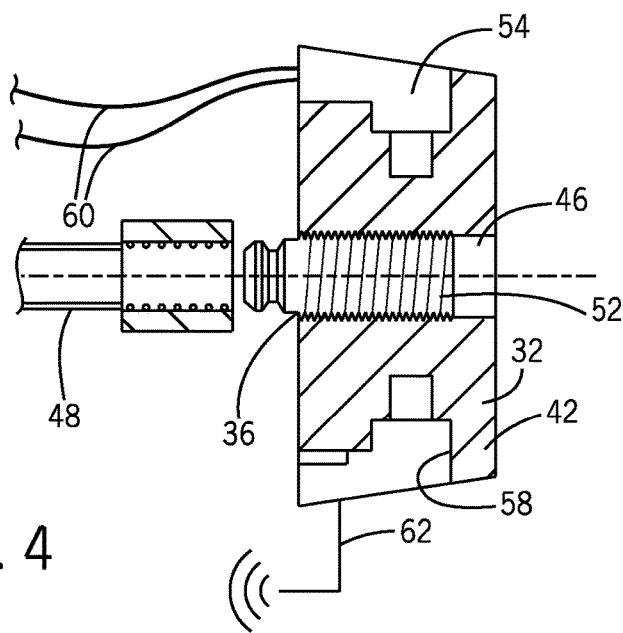
FIG. 4 is a cross-sectional view of the purge plug of FIG. 3, in accordance with aspects of the present disclosure.

FIG. 3 is a perspective view of an embodiment of the purge plug 32 with a sensor at least partly disposed in the purge plug 32. While the illustrated embodiment specifically refers to the purge plug 32, the purge plug 34 may also include one or more sensors. Because the figure includes like elements as described above with respect to FIG. 2, the like elements are depicted with like numbers. As illustrated, the purge plug 32 includes a sensor 52 disposed in the hub 36. The sensor 52 may be any suitable sensor, such as a pressure sensor, a temperature sensor, a receiver (e.g., an x-ray receiver such as a Panorex™ receiver, an ultrasound receiver), and so forth. For example, the sensor 52 may be a temperature sensor such as a thermocouple, a bimetallic switch, a resistance temperature detector (RTD), a thermistor, a wax motor, and/or an infrared detector. The purge plug 32 also includes sensors 54, 56, and 58 disposed in the sealing structure 42. For example, the sensors 54, 56, and 58 may be positioned to abut (e.g., contact) a surface (e.g., an inside surface, an outside surface, etc.) of the workpiece 28, such as for detecting temperatures of the workpiece 28. The sensors 54, 56, and 58 may also be any suitable sensor similar to the sensor 52 (e.g., pressure sensors, temperature sensors, receivers, or a combination thereof). Furthermore, the sensors 52, 54, 56, and 58 may be configured to provide data using wired and/or wireless communication. With the sensors 52, 54, 56, and 58 at least partly disposed in the hub 36 and/or the sealing structure 42 of the purge plug 32, various parameters within a purged environment may be detected and/or monitored. For example, a pressure and/or a temperature within a purged hollow device may be detected. Furthermore, a scan (e.g., an x-ray) of a weld may be obtained while the hollow device is purged. Accordingly, the sensors 52, 54, 56, and 58 may aid in detecting and/or monitoring a quality of a weld. FIG. 4 is a cross-sectional view of the purge plug 32 of FIG. 3. Because the figure includes like elements as described above with respect to FIGS. 2 and 3, the like elements are depicted with like numbers. As illustrated, the sensor 54 is configured to communicate using leads 60 (e.g., wired communication), while the sensor 58 is configured to communicate using wireless signals 62 (e.g., wireless communication). However, as may be appreciated, any combination of wired and/or wireless sensors (or communication) may be used.

Figure 5:
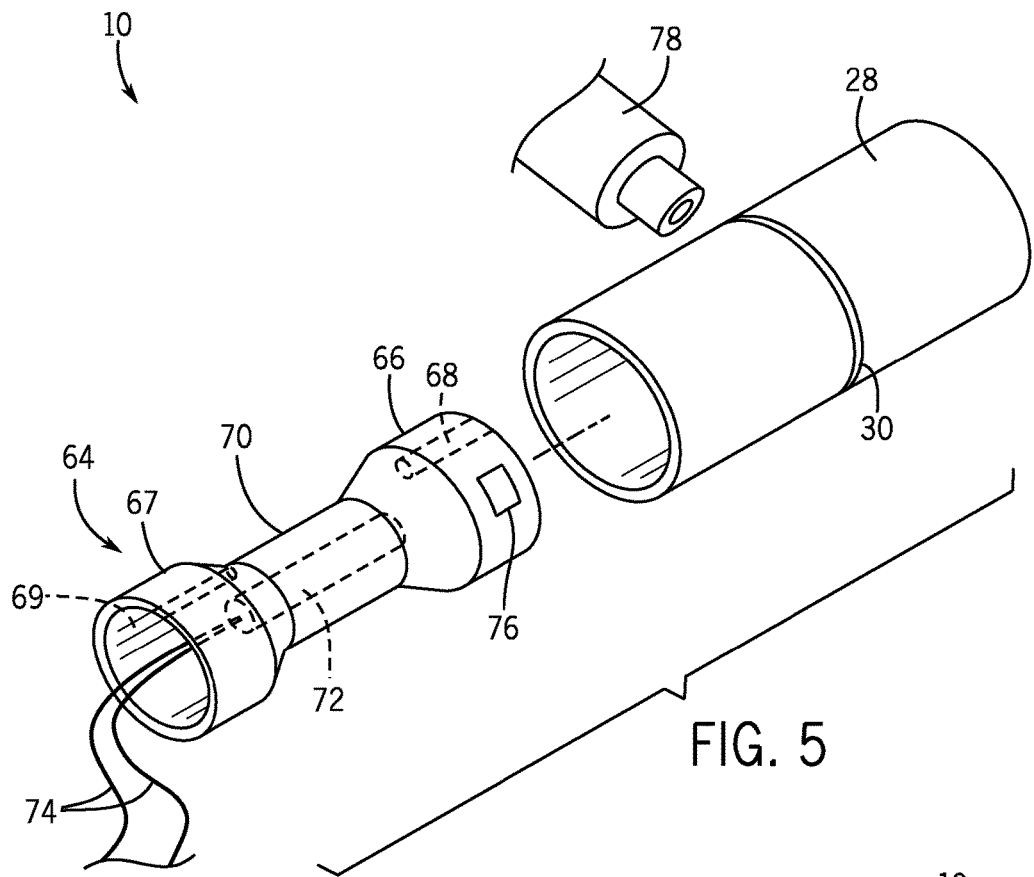
FIG. 5 is a perspective view of an embodiment of a welding system having a purge plug with multiple sealing structures, in accordance with aspects of the present disclosure.

FIG. 5 is a perspective view of an embodiment of the welding system 10 having a purge plug 64 with multiple sealing structures. Specifically, the purge plug 64 includes a first sealing structure 66 on one end, and a second sealing structure 67 on an opposite end. As may be appreciated, at least one of the first sealing structure 66 and the second sealing structure 67 may include an inlet for receiving an inert gas (e.g., argon). Moreover, at least one of the first sealing structure 66 and the second sealing structure 67 may include an outlet for releasing unwanted gas (e.g., oxygen, nitrogen, etc.). As illustrated, the first sealing structure 66 includes an inlet 68, while the second sealing structure 67 includes an outlet 69. The inlet 68 is configured to receive an inert gas, and the outlet 69 is configured to enable undesirable gases to exit the interior of the workpiece 28.

A shaft 70 extends between the first and second sealing structures 66 and 67, and couples the first and second sealing structures 66 and 67 together. Using the purge plug 64, a volume around the shaft 70 and within the interior of the workpiece 28 (between the first and second sealing structures 66 and 67) may be purged. Furthermore, a device 72 (e.g., a sensor, a transmitter such as an x-ray transmitter, ultrasound transmitter, etc.) may be disposed in the shaft 70 for detecting parameters and/or for transmitting signals (e.g., x-rays, ultrasonic energy). The device 72 may be any suitable sensor, such as a pressure sensor, a temperature sensor, a receiver (e.g., an x-ray receiver such as a Panorex™ receiver, ultrasound receiver), and so forth. For example, the device 72 may be a temperature sensor such as a thermocouple, a bimetallic switch, a resistance temperature detector (RTD), a thermistor, a wax motor (e.g., actuator device suitable for converting thermal-to-mechanical energy via phase change behavior of waxes), and/or an infrared detector. In certain embodiments, leads 74 are coupled to the device 72 to facilitate wired communication, such as for providing data from the device 72. In other embodiments, the device 72 may communicate wirelessly. The purge plug 64 also includes a sensor 76, such as a pressure sensor, a temperature sensor, a receiver (e.g., an x-ray detector), and so forth. As illustrated, a transmitter 78 (e.g., x-ray transmitter, transmitter for a computed tomography (CT) system, etc.) may be used in conjunction with the device 72 to take a scan of the joint 30, such as before, during, and/or after a weld is performed on the joint 30. Accordingly, a quality of the weld joint 30 may be determined.

Figure 6:
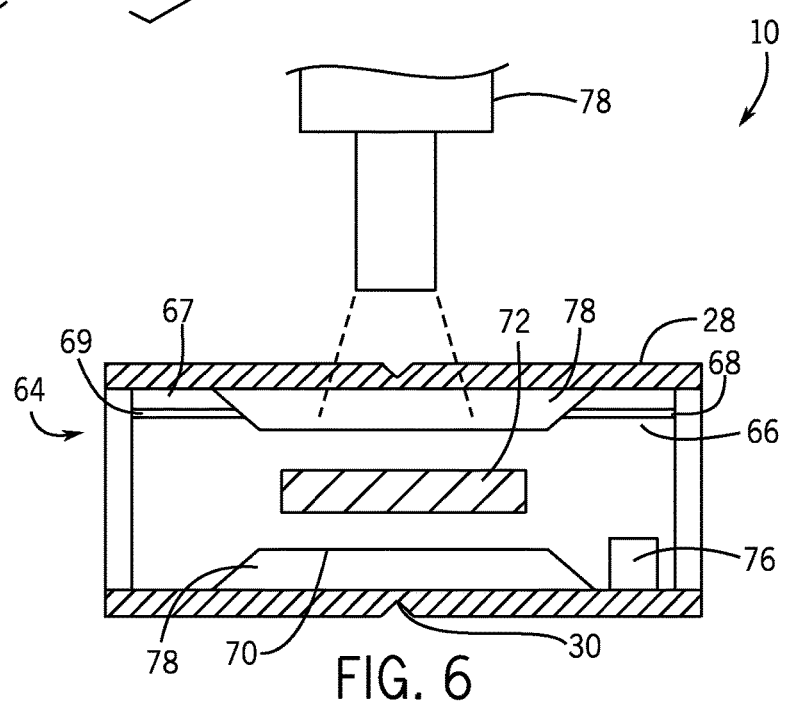
FIG. 6 is a cross-sectional view of an embodiment of a welding system using the purge plug of FIG. 5, in accordance with aspects of the present disclosure.

FIG. 6 is a cross-sectional view of an embodiment of the welding system 10 using the purge plug 64 of FIG. 5. Because the figure includes like elements as described above with respect to FIG. 5, the like elements are depicted with like numbers. As illustrated, the sensor 76 may abut the inside surface of the workpiece 28, such as for detecting a temperature of the workpiece 28. Furthermore, gaps 78 between the shaft 70 and the workpiece 28 are illustrated. The gaps 78 are portions within the workpiece 28 that are purged from undesirable gases when inert gas is provided to the inlet 68.

As may be appreciated, in certain embodiments, the sensors 52, 54, 56, 58, and 76 may be configured to store data, such as in a memory of the sensor. For example, the detector may be configured to store data corresponding to transmissions detected. Using the sensors and other devices (e.g., device 72) described herein, temperatures, pressures, and/or other parameters of the workpiece 28 may be detected, monitored, and/or acquired. Accordingly, a quality of a weld performed on the joint 30 may be determined and/or controlled. For example, temperatures that a workpiece is exposed to during the welding operation may be determined. Furthermore, a pressure of gas within a hollow device may be monitored. Moreover, a quality of a weld may be examined by using a transmitter and receiver (e.g., x-rays).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A purge plug system comprising:
a purge plug component comprising a sealing structure, wherein the sealing structure is configured to abut a surface of a hollow device and to form a seal between the sealing structure and the hollow device when the purge plug component is inserted into the hollow device; and
a sensor integrated with the sealing structure and configured to contact the surface of the hollow device when the purge plug component is inserted into the hollow device, wherein the purge plug component is configured to be disposed on a workpiece having the hollow device to purge an undesired gas from the workpiece, and wherein the sensor is configured to detect a parameter related to the workpiece.

2. The purge plug system of claim 1, wherein the sensor comprises a temperature sensor.

3. The purge plug system of claim 2, wherein the temperature sensor comprises a thermocouple, a bimetallic switch, a resistance temperature detector (RTD), a thermistor, a wax motor, and an infrared detector.

4. The purge plug system of claim 1, wherein the sensor comprises a pressure sensor, gas sensor, or a combination thereof.

5. The purge plug system of claim 1, wherein the sensor comprises a receiver.

6. The purge plug system of claim 5, wherein the receiver comprises an xray receiver, an ultrasound receiver, or a combination thereof.

7. The purge plug system of claim 1, wherein the sensor comprises a wireless sensor.

8. The purge plug system of claim 1, wherein the sensor comprises a wired sensor.

* * * * *